Patented Dec. 15, 1936

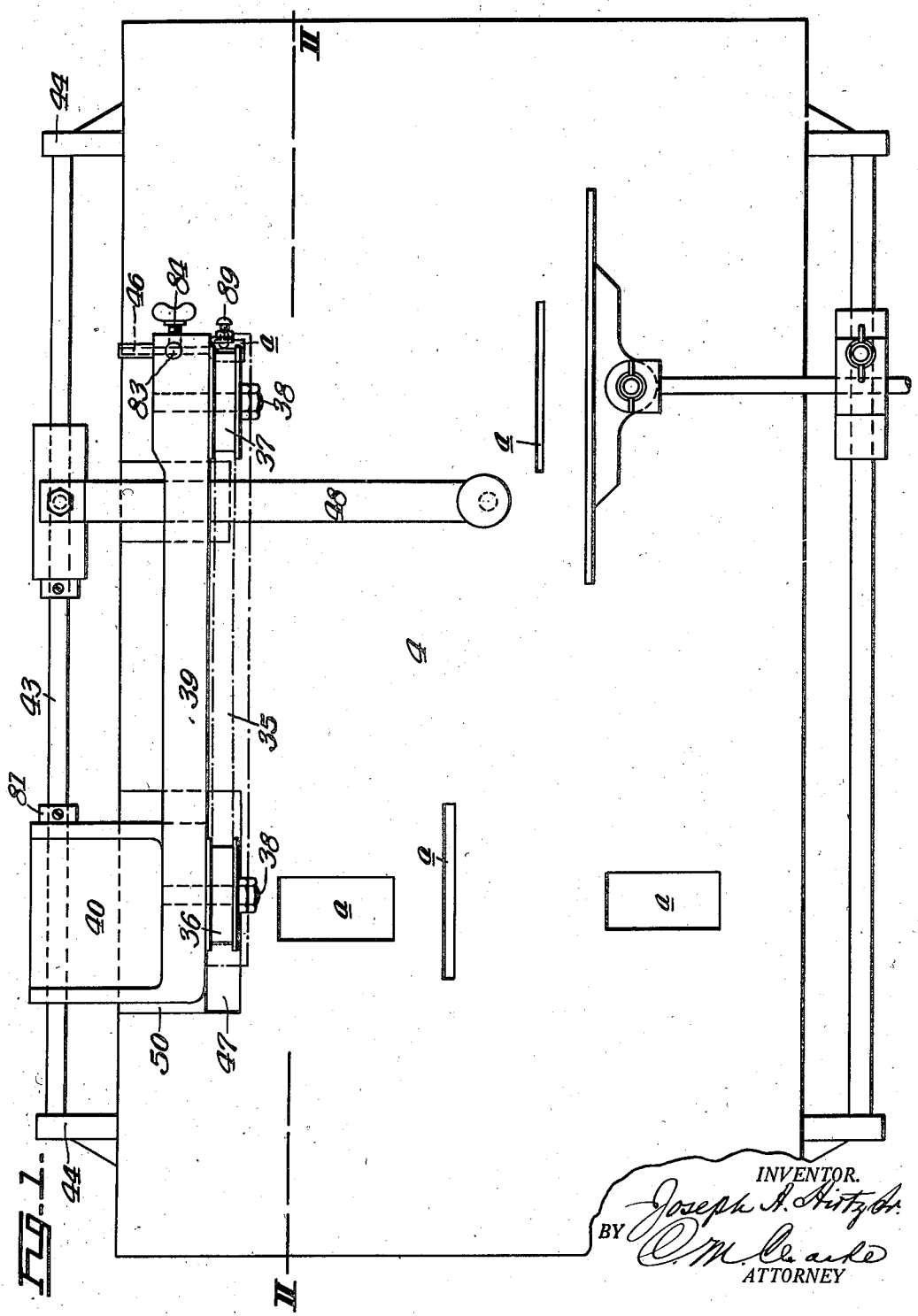

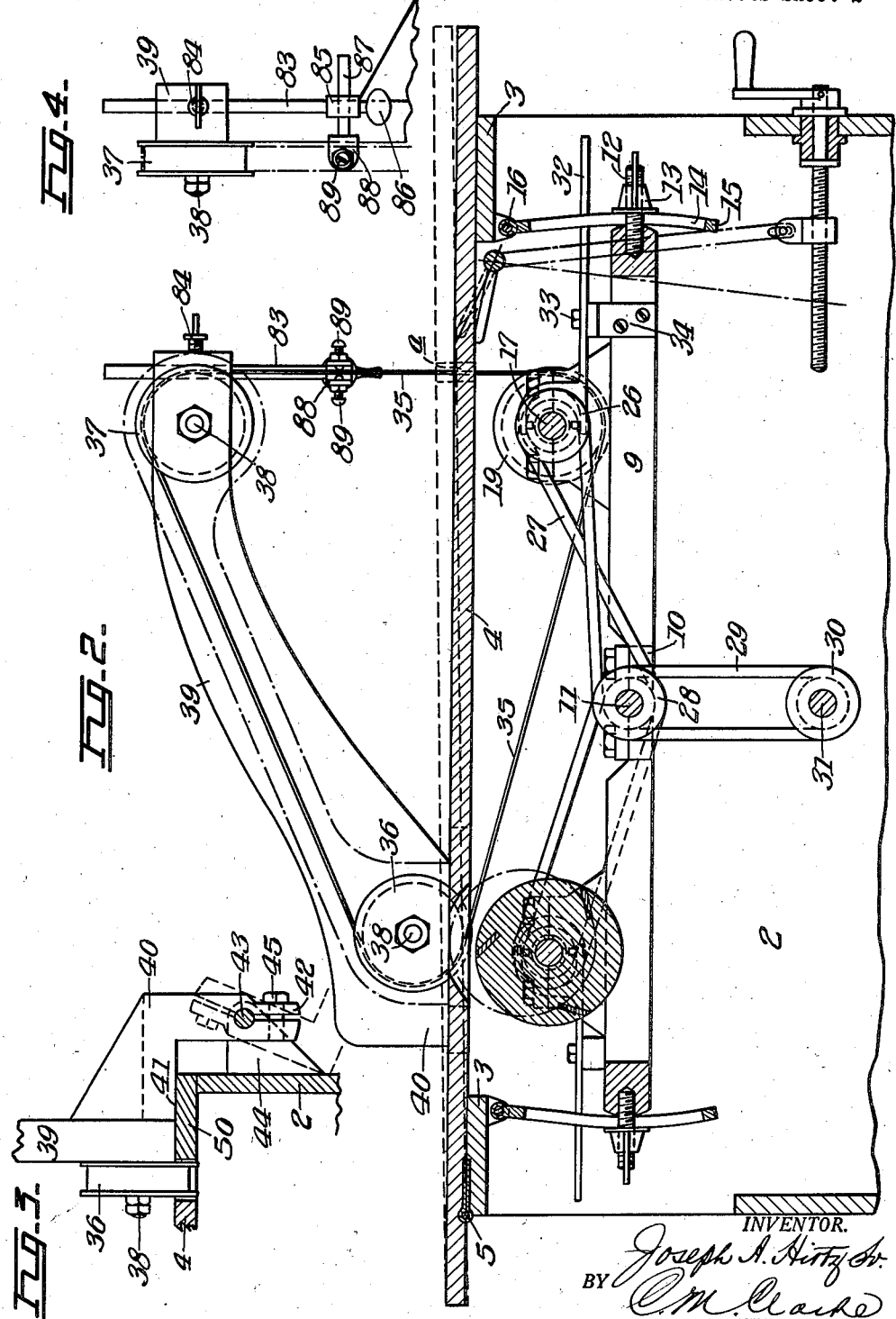

2,064,605

UNITED STATES PATENT OFFICE 2,064,605

BAND SAW ATTACHMENT FOR WOODWORKING MACHINES

Joseph A. Hirtz, Sr., Mount Oliver, Pa., assignor of one-half to Ellsworth J. Smith, Sr., Mount Oliver, Pa.

Original application March 13, 1935, Serial No. 10,827. Divided and this application April 17, 1936, Serial No. 74,946

5 Claims. (Cl. 143—17)

My invention consists of an improvement in woodworking machines and is a division of my prior application Ser. No. 10,827, filed Mar. 13, 1935.

The particular portion of the original application herein involved relates to the band saw construction therein disclosed, and is illustrated and described herein as an operative part of the whole original machine.

The machine as a whole comprises a suitable supporting frame provided with a cover top or table, preferably adjustable to varying inclination, and capable of being elevated to inoperative position for access to the interior. The band saw unit is so mounted as to be capable of adjustment towards or from the operating plane of the table top and to be actuated through driving connections with a prime mover, with suitable clutch mechanism and various co-operating and other elements, as hereinafter described.

Referring to the drawings:—

Fig. 1 is a general plan view of the machine showing the band saw and its frame tiltably mounted at one side of the table top, in connection with a similarly mounted jig saw;

Fig. 2 is a longitudinal vertical section on the line II—II of Fig 1;

Fig. 3 is a detail sectional view showing the tilting support mounting of the base of the band saw frame or arm;

Fig. 4 is an end view of the band saw frame and guide.

Referring to the drawings, the supporting framework 2 is generally rectangular, having side and end walls and a suitable mounting base for rigid placement. The frame is preferably made of a single casting and having at its upper portion flat supporting side edges and end bearing members 3 for the adjustable table 4. The latter is hinged to one end portion of the frame, as at 5, and is capable of being entirely raised out of the way and supported by any suitable means.

As shown, the top 4 is provided with suitable clearance openings *a* for the band saw and other operating elements, not herein involved.

For the purpose of adjustably mounting the driving pulley 19 of the band saw in operative and inoperative position, respectively, I provide a vertically swinging frame 9. It is preferably bifurcated or double sided, and provided with a pair of inner terminal bearings 10 engaging a common hinge or rock shaft 11 extending across between the opposite side walls of the frame 2.

By such construction the frame is thus pivotally mounted on the rock shaft and is capable of upward and downward tilting adjustment, with its driving and driven pulleys. At its opposite end frame 9 is provided with a securing screw stud 12 having a tightening and loosening thumb nut 13 and extending through the slot 14 of an arcuate support 15 pivoted at 16 to the under side of frame member 3. By such construction it will be seen that the frame may thus be raised or lowered on its hinge shaft 11 and secured in position for operative or inoperative placement, as desired.

Tilting frame 9 is provided at its outer middle swinging portion with a driven shaft 17 to which is secured the driving pulley 19. Shaft 17 is also provided with a freely mounted driven pulley or sheave 26 in adjustable clutch connection with the shaft.

A belt 27 connects pulley 26 with a plural groove driving pulley or sheave 28 freely mounted on rock shaft 11. The pulley 28 is geared by belt or cord 29 to a driving pulley 30 of main shaft 31, and shaft 31 is geared with a suitable prime mover, as an electric motor, not shown.

A clutch lever 32 pivoted at 33 on bracket 34 of the frame 9 extends outwardly towards the free end of frame 9 for easy access and manipulation, for control of power to pulley 26 to drive or disconnect pulley 19.

The band saw 35, as is usual, is of a continuous strip form of proper length, and passes around driving pulley 19 of shaft 17 and likewise around similar idle pulleys 36 and 37.

Idler band pulleys 36 and 37 are rotatably mounted on studs 38 extending inwardly from the mounting base portion and terminal of a bracket frame 39. The base portion 40 is of block formation having a flat base 41 adapted to seat on the inwardly extending upper edge portion 50 of the frame 2. Base 40 has a downward preferably divided extension 42, in sliding and clamping engagement with a supporting shaft 43 mounted by brackets 44 along the upper outer portion of frame 2.

Extension 42 is provided with tightening screws 45 by which it may be located in operative position as in Fig. 3 or loosened and thrown outwardly and down to inoperative position.

Outer side shaft 43 is provided with one or more ring abutments 81, having a set screw or the like, for limiting sliding movement of base 40 whereby to define the operative position of arm 39 when located in position for work.

When erected as in Fig. 2, and the band saw 35 is tightened by lowering pulley 19 by its frame 9, the band saw is maintained in driving and guiding engagement with its pulleys.

When pulley 19 is raised the saw becomes slack and may be removed from said pulley and thrown outwardly through slot 46 of the cover plate and clearance 47. The cover may then be raised for such purpose, allowing for removal of the band saw from pulleys 36 and 37.

Similarly mounted for longitudinal and tipping movement on shaft 43, may be located a jig saw frame 48, extending across under frame 39, as in Fig. 1.

Depending from the outer end or head portion of frame 39 is a vertically adjustable spindle 83 mounted within the head and secured by a set screw 84. At the lower end of spindle 83 is a terminal bearing 85 having a securing set screw 86 for fixed adjustment of a cross pin or shaft 87 provided with a bifurcated terminal guide 88.

The band saw 35 is positively guided between the sides of guide member 88 or adjusting screws 89 thereof, maintaining it in fixed relation to the cutting zone of material in passing it over the surface of cover plate 4. By the adjustment of spindles 83 and 87, such guide may be located closely adjacent to the work for maintenance of positive action.

By such means the band saw is maintained in desirable working relation with its actuating means and the raw material being operated upon.

The construction and operation of the band saw member of the composite machine herein presented, and disclosed in my former application, will be readily understood and appreciated by all those familiar with wood working machinery.

The entire frame and its parts together with the adjustment of the driving pulley, provide for easy utilization or disuse when not desired.

Thus the main frame 39 being slidably and rotatably mounted on rock shaft 43 may be accurately set to working location, or thrown outwardly, as in dotted lines, Fig. 3. The manufacture and application of the band saw construction to a multiple wood working machine, or as a single installation, is comparatively simple, cheap, and capable of location in a limited space.

What I claim is:—

1. In a woodworking machine, in combination with a main supporting frame and an apertured work surface top and a lateral hinge rod, a laterally swinging band saw frame hinged thereon for vertical erection on the upper frame edge and having a band pulley, a transverse hinge shaft, a frame hinged thereon provided with a rotatable shaft provided with a driving band pulley, driving means on the hinge shaft geared with the band pulley shaft, and means for locating the hinged frame at varying positions for operative and inoperative relation of the band pulleys.

2. In a woodworking machine, in combination with a main supporting frame having a work surface top provided with an open ended saw clearance slot and a lateral hinge rod, a laterally swinging band saw frame hinged thereon for vertical erection on the upper frame edge and having an inner lower and an outer upper band pulley, a transverse hinge shaft, a frame hinged thereon having a rotatable shaft provided with a driving band pulley, driving means on the hinge shaft geared with the band pulley shaft, and means for locating the hinged frame at varying positions for operative and inoperative relation of the band pulleys by lateral swinging movement to pass the band saw edgewise through the clearance slot.

3. In combination with a supporting frame having an upper supporting edge portion and a lateral hinge rod, a laterally swinging band saw frame hinged on said rod having a base engageable with said edge portion for erection thereon and provided with a band pulley, a lower tightening and driving pulley and adjusting and driving means therefor, a band saw engaging said pulleys adapted to be swung edgewise laterally on the hinge rod with its frame upon disconnection from the driving pulley, and an intervening work supporting platform having clearance openings for the band saw.

4. In combination with a supporting frame having an upper supporting edge portion and a lateral hinge rod, a laterally swinging band saw frame slidably hinged on said rod, said frame having a projecting arm, a tightening clamp, and a base engageable with said edge portion for erection thereon, a band pulley on the base and the outer terminal of the arm respectively, a lower tightening and driving pulley in rim alinement with the arm terminal pulley, adjusting and driving means therefor, a band saw engaging said pulleys, and an intervening work supporting platform having clearance openings for the band saw.

5. In combination with a supporting frame having an upper supporting edge portion and a lateral hinge rod, a laterally swinging band saw frame hinged on said rod and having a base engageable with said edge portion for erection thereon and provided with an outwardly and upwardly extending arm provided at its terminal with an idler band pulley, a registering idler band pulley on the frame spaced backwardly from said terminal pulley, a lower tightening and driving pulley registering with said pulleys when the frame is erected, adjusting and driving means for said lower pulley, a band saw engaging said pulleys, and an intervening work supporting platform having clearance openings for the band saw.

JOSEPH A. HIRTZ, Sr.